Patented July 14, 1931

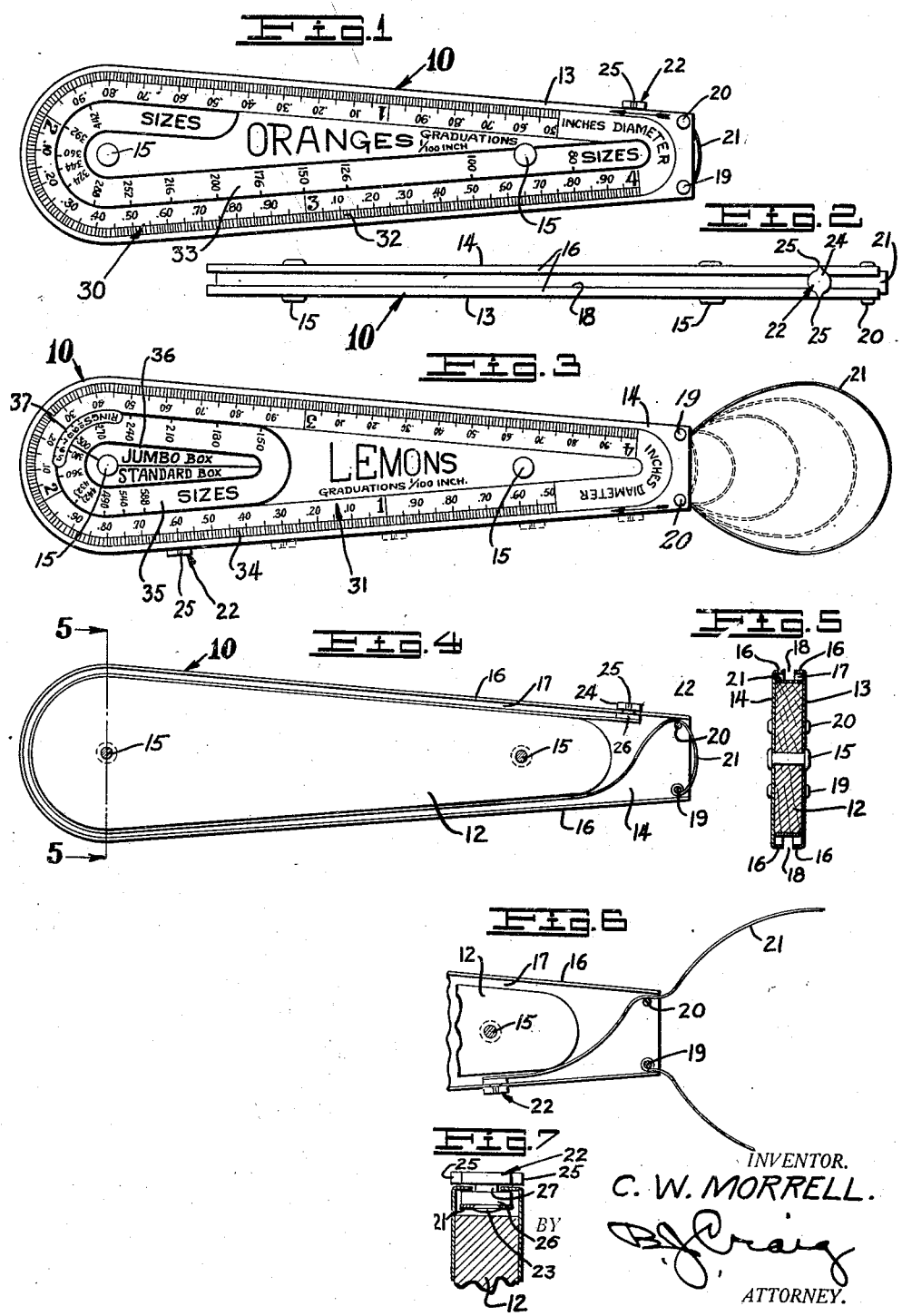

1,814,401

UNITED STATES PATENT OFFICE

CHARLES W. MORRELL, OF SOUTH PASADENA, CALIFORNIA

FRUIT CALIPER

Application filed May 13, 1929. Serial No. 362,482.

This invention relates to improvements in calipers.

The general object of the invention is to provide an improved caliper particularly adapted for measuring the diameter of fruit and vegetables and more particularly citrus fruit such as oranges and lemons.

Another object of the invention is to provide a caliper which includes a non-stretchable flexible member which is adapted to surround the object being measured.

An additional object of my invention is to provide a circumference caliper having a flexible measuring band and including an operating member on the band for moving the band.

A further object of the invention is to provide a caliper of the class described having a plurality of scales thereon for indicating the diameter of an object being measured and for indicating the grade.

Other objects of the invention will be apparent from the following description taken in connection with the accompanying drawings wherein:

Fig. 1 is an elevation of one side of my improved fruit caliper.

Fig. 2 is a top plan view of the device shown in Fig. 1.

Fig. 3 is an elevation showing the side opposite to that shown in Fig. 1.

Fig. 4 is a view similar to Fig. 1 with one of the side plates removed.

Fig. 5 is a section taken on line 5—5 of Fig. 4.

Fig. 6 is a fragmentary view similar to Fig. 4 showing the measuring top in an extended position.

Fig. 7 is an enlarged fragmentary vertical section through the device showing the construction of the operating button.

Referring to the drawings by reference characters I have indicated my improved fruit caliper generally at 10. As shown this device includes a body portion 12 having side members 13 and 14 secured thereto as by rivets 15. The body portion 12 is preferably made of wood with each of its ends rounded and the side members are preferably made of sheet metal. The side members 13 and 14 extend a considerable distance beyond one end of the body portion and include inturned flanges 16 which are spaced from the body portion to form a channel 17 and the ends of the opposed flanges are spaced apart to form a slot 18. These flanges 16 extend from one side of the extended end portion and around the opposite end of the device to the opposite side of the extended end portion leaving the extended end open the full width of the body portion. The extended ends of the side members are secured together by rivets 19 and 20.

Positioned in the channel 17 I provide a measuring band 21 which is preferably made of thin flexible spring metal and is secured at one end to the rivet 19. From the rivet 19 the band extends over the rivet 20, then downward to the channel 17 on the side opposite the rivet 19, and when in a retracted position as shown in Fig. 4 the band extends around the body portion 12 to a point adjacent the extended end. The free end of the band 21 is provided with an operating button 22 to which it is secured as by a riveted portion 23 or in any other desired manner (see Fig. 7).

The operating button 22 includes a top portion 24 having indicating pointers 25 thereon and a bottom portion 25 connected to the top portion by a reduced neck 27. The reduced neck 27 is positioned in the slot 18 and the bottom portion 26 is positioned between the inner sides of the flanges 16 and the body portion 12.

On one side of the device I provide a scale indicated generally at 30 such as an orange scale and on the opposite side I provide a scale indicated generally at 31 such as a lemon scale (see Figs. 1 and 2). As shown the orange scale 30 includes a portion 32 which indicates the diameter of the fruit in hundredths part of an inch and a portion 33 which indicates the packing sizes.

The lemon scale 31 includes a portion 34 which indicates the diameter of the fruit in hundredths part of an inch, a portion 35 which indicates the packing sizes, a portion 36 which indicates the box sizes and a portion 37 which indicates the picker's ring sizes.

When the measuring band 21 is in a retracted position the operating button is in a position adjacent the rivet 20 as shown in Figs. 1, 2 and 4. As the button 22 is moved towards the opposite end of the device the band 21 is moved outward from the end of the device as clearly shown in Fig. 3. The operating button 22 may be moved completely around the device to a position opposite its initial position wherein the top 21 is in a fully extended position (see Fig. 6).

To caliper fruit with my improved device the operator moves the button 22 to extend the band 21, places the band around the fruit and then moves the button to retract the band so that it snugly engages the fruit. Whereupon by looking at the correct scale the corresponding pointer 25 will indicate the diameter of the fruit. The construction and material is such that the band will remain in a set position until moved.

Although I have shown and described my improved caliper as for measuring the diameter of the fruit it will be understood that it may be used for any purpose to which it is applicable.

From the foregoing description it will be apparent that I have provided an improved caliper which is simple in construction and highly efficient in use.

Having thus described my invention, I claim:

1. In a caliper, an elongated body portion, side members secured to said body portion, means to form a channel around the top, bottom and one end of said body, the opposite end being open, and a measuring band comprising a strip of non-stretchable material secured at one end adjacent said open end and extending in said channel around said body portion.

2. In a caliper, an elongated body portion, means to form a channel at the top, bottom and one end of said body, a measuring band comprising a strip of non-stretchable flexible material extending in said channel around said body portion and operating means for moving said band.

3. In a caliper, an elongated body portion, side members secured to said body portion, means to form a channel around the top, bottom and one end of said body, the opposite end being open, a measuring band comprising a strip of non-stretchable flexible material pivotally secured adjacent said open end, extending in said channel around said body portion to the side opposite said secured end, and operating means at the free end of said band.

4. In a caliper, an elongated body portion, side members secured to said body portion and projecting beyond the body at one end, means to form a channel around the top, bottom and the other end of said body, said one end being open, a measuring band, said band comprising a strip of non-stretchable material loosely secured adjacent said open end and extending in said channel around said body portion to the side opposite said secured end, an operating member secured to the free end of said band, a pair of pointers on the sides of said member, a graduated scale on each of said side members, each of said pointers being adapted to operate in conjunction with one of said scales.

5. In a caliper, an elongated body portion, side members secured to said body portion, inturned flanges on said side members spaced from said body portion and extending around the top, bottom and one end to form a channel and the opposite end being open, the inner ends of said flanges being spaced apart to form a slot, a pair of spaced transverse members connecting said side members adjacent said open end, said transverse members being positioned adjacent opposite flanges of said side members, a band comprising a strip of non-stretchable flexible material loosely secured at one end to one of said transverse members and extending from said open end side between said other transverse member and the adjacent flange.

6. In a caliper, an elongated body portion, side members secured to said body portion, inturned flanges on said side members spaced from said body portion and extending around the top, bottom and one end to form a channel, the opposite end being open, the inner ends of said flanges being spaced apart to form a slot, a pair of spaced rivets connecting said side members adjacent said open end, said rivets being positioned adjacent opposite flanges of said side members, a measuring band, said band comprising a strip of non-stretchable flexible material loosely secured at one end to one of said rivets and extending from said open end side between said other rivet and the adjacent flange, and positioned in said channel formed by said side member flanges adjacent said securing rivet and extending in said channel around said body portion to the side opposite said securing rivet to a point adjacent said open end, an operating button secured to the free end of said top, said button including a top portion and a bottom portion connected by a reduced neck, said bottom portion being positioned in said channel and said reduced neck being positioned in said slot, a pair of oppositely disposed pointers on the sides of said top member, a graduated scale on each of said side members and said pointers being adapted to operate in conjunction with said scales.

In testimony whereof, I hereunto affix my signature.

CHARLES W. MORRELL.